Jan. 13, 1959

R. L. ROOF 2,868,546

TURNTABLE POST FRICTION FINGER

Filed April 29, 1953

INVENTOR.
RICHARD L. ROOF
BY Michael Hertz
Attorney

United States Patent Office 2,868,546

Patented Jan. 13, 1959

2,868,546

TURNTABLE POST FRICTION FINGER

Richard L. Roof, Buffalo, N. Y., assignor to Sylvania Electric Products Inc., a corporation of Massachusetts Application April 29, 1953, Serial No. 351,963

3 Claims. (Cl. 274—10)

This invention relates to phonoplayers of the automatic record changer disc type wherein after a record on a turntable has been played, a second record is piled thereon, played, and then other records in sequence are placed thereon to be played.

Because the friction between records is none too good, undesirable slippage frequently occurs between records as a top record is being played and it not infrequently happens that the top record is revolving at irregular speeds or at a slower speed than the turntable, thereby resulting in distortion in reproducing the transcription on the record.

It is an object of this invention to overcome this defect.

It is a further object to provide a simple means revolvable with the turntable to frictionally engage the records after they have been placed on the turntable to restrain them against rotation relative to the turntable.

It is a still further object of the invention to provide a record release and record storage mechanism rotatable with the turntable which shall be coordinated with a means on the turntable to prevent undesired slippage of the record being played with respect to the turntable.

Other objects will be apparent after reading the following specification in conjunction with the accompanying drawings in which Fig. 1 is a vertical section through a phono turntable and post embodying my invention and disclosing several records on the turntable and others in position on the post to be sequentially dropped on the records below.

Figures 1, 2, 3, 4, 5:
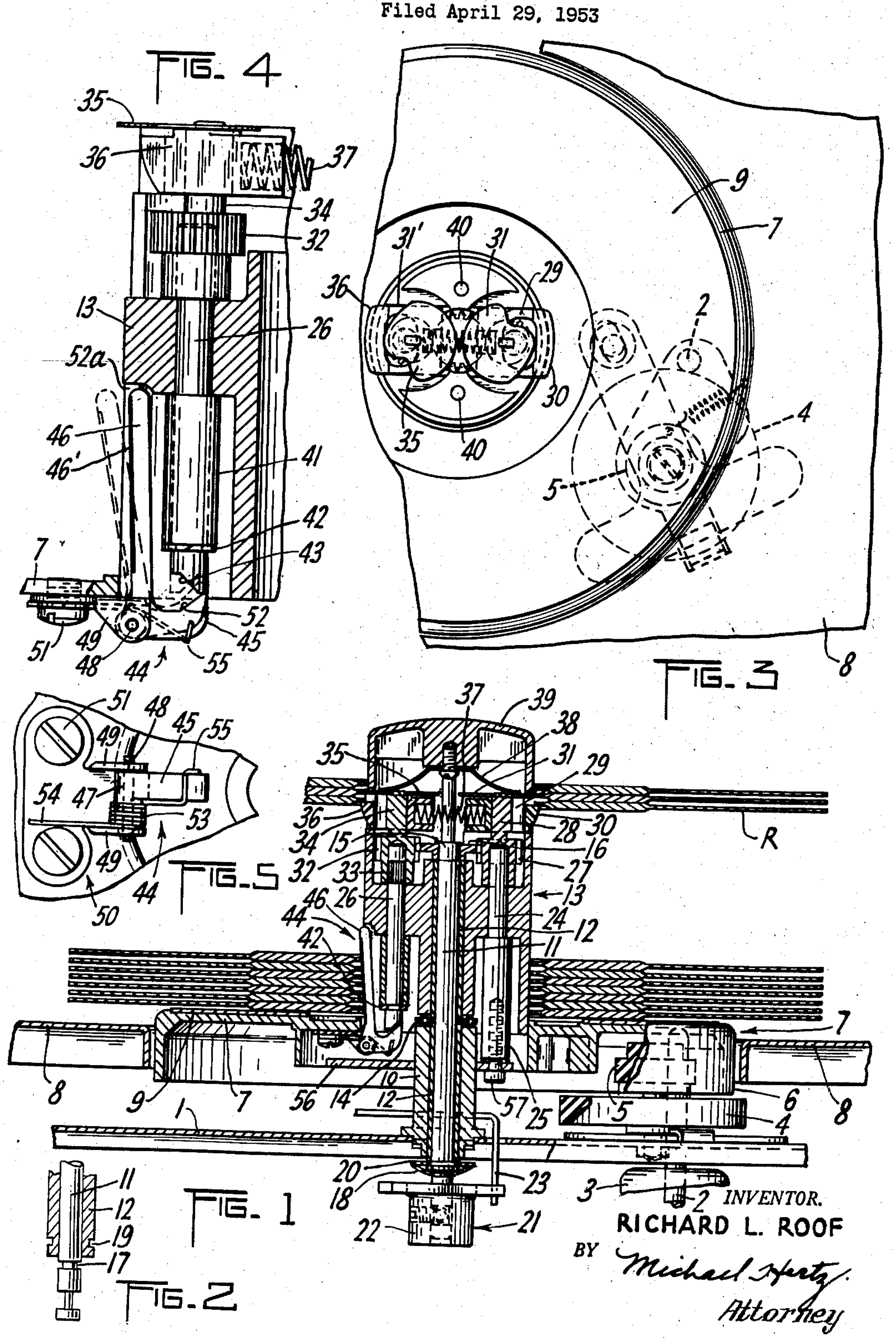
Fig. 2 is a detail view of the lower end of a record release and friction disc control shaft and its sleeve.
Fig. 3 is a fragmentary plan view of the turntable and its record receiving post with the cap of the post removed to show interior construction, a portion of the motor drive for the turntable being shown in dotted lines.
Fig. 4 is a vertical section through a portion of the frictional means employed to restrain rotation of the phono discs relative to the turntable and post.
Fig. 5 is a bottom view of the portion shown in Fig. 4.

Referring to the drawings in greater detail there is shown a portion of a phonoplayer comprising a base plate 1 supporting a motor driven spindle 2 extending through a motor housing 3, this spindle driving a friction ring 4. Fast with the ring 4 is a smaller turntable friction drive ring 5 adapted to engage the inner surface of a flange member 6 depending from the turntable 7. Surrounding the turntable and enclosing operating mechanism of the changer is the housing 8. This is conventional structure and needs no greater detail of description. The turntable is usually covered with felt 9 or other non slip material. Supported by the base plate is a turntable support pedestal and bearing member 10. Mounted for rotation in the pedestal 10 is a record release and friction control shaft 11. This shaft rotates within a bushing or sleeve 12 driven into a turntable post 13, said turntable post being fast to the turntable 7 so as to rotate therewith. The lower end of the bushing extends beyond the lower end of the post 13 and is snugly received in the pedestal 10. The turntable and post are non frictionally supported on the pedestal through the intermediary of an end thrust roller bearing 14 encircling the sleeve 12 and interposed between pedestal 10 and post 13. The sleeve 12 is rotatable in the pedestal.

At the upper end of the shaft 11 is a reduced portion 15 to which is secured in driving relation a gear 16. The lower end of the shaft is provided with a recessed grooved portion 17 accommodating a curved C-shaped spring washer 18, this washer serving to prevent shaft withdrawal upwardly through the sleeve. Likewise, the lower end of the sleeve is grooved at 19, and receives a flat C-shaped washer 20 to prevent unintentional withdrawal of the turntable post and turntable from its pedestal. The lower end of the spindle 11 also has mounted on it a star wheel 21. The star wheel has a collar 22 secured to the shaft 11 by suitable set screws. Cooperating with the star wheel is an oscillatable star wheel rotation arresting member 23, which member is coordinated with the operation of the changer to effect relative rotation of the shaft 11 with respect to the turntable upon the tone arm approaching close to the post, to effect release of a record from the storage pile onto the turntable, as the tone arm is shifted out of the way and then onto the new record, all as is old in the art.

Within the post 13 is a fixed pin 24 having an enlarged portion 25, and a rotatable shaft 26, each surmounted by a gear meshing with the gear 16. The gear 27 is rotatable about the pin 24 and carries at its upper end an eccentric pin 28 riding in an elongated slot 29 of a displaceable record support ledge member 30, this ledge member being guided for rectilinear movement in a transverse channel 31' formed in the upper end of the post, from a position projecting beyond the post 13 to a position within the perimeter thereof. The slot in the ledge member is wider than the diameter of the eccentric pin in a direction longitudinally of the length of the passageway in the post. Rigidly secured to the upper end of the eccentric pin is a thin cam shaped separator knife disc 31 so shaped and positioned relative to the ledge member that when the ledge member is in projected position relative to the post 13, the knife disc is retracted and vice versa.

On the rotatable shaft 26 is mounted a gear 32 fixed against rotation thereon by means of fluted surfaces 33 on the shaft and within the gear. This gear provides a mount for an eccentric pin 34 and separator knife disc 35 similar to the eccentric pin and knife disc on the companion gear 27. The eccentric pin 34 operates a ledge member 36 similar to the ledge member 30. Interposed between the two ledge members 30 and 36 and mounted in two opposing holes in these members is an expansible coiled spring 37, tending to thrust the ledge members so that the ledge supporting edges thereof are outwardly of the post. The parts are mounted on the post so that upon partial rotation of the shaft 11, both ledge members 30 and 36 will be drawn inwardly together by the eccentric pins 28 and 34 to release a record while in the meantime the disc members 31 and 35 have knifed their way between the lowermost record and the one immediately thereabove to support the records above the knife discs. Further rotation of the shaft 11 again permits the ledge members to be projected beneath the record discs just supported by the knife discs, while the knife discs are rotated to a non record disc supporting position. Play longitudinally of the post passageway 31' between the eccentric pins and the ledge members is provided to permit the spring to yieldingly urge the ledge members to their projected positions to prevent breakage of the record discs should the record discs not be in proper position when the ledge members are projected. To allow for slight yieldably restrained vertical movement of the knife discs, a leaf spring 38 secured to a cap 39 is provided, this cap being fastened to the post by means of screws passed upwardly through holes 40 in the post which register with threaded holes (not shown) in the cap.

As pointed out heretofore, when a number of disc records have piled up on the turntable, the top record, the one being played, is apt to slip with respect to the turntable thereby affecting the quality of reproduction of the transcription. It is to avoid this that the following provisions have been made.

The shaft 26 is rotated upon rotation of the shaft 11 relative to the turntable by reason of the meshed gears 16 and 32 and by reason of the gear 32 being mounted on shaft 26 for rotation therewith. The lower end of shaft 26 extends through a sleeve 41 and is provided with a recessed portion to accommodate a C washer 42 to prevent upward withdrawal of the shaft 26. Downward withdrawal of the shaft is resisted by the tight fit of the gear 32 on the upper fluted portion of the shaft. The lower end of the shaft is provided with a bevelled surface 43 in a plane at approximately 45° to the longitudinal axis of the shaft. Cooperating with this bevelled end of the shaft is a bell crank lever 44. This bell crank lever has two arms 45 and 46 integral with a sleeve portion 47 mounted on a pintle 48 extending between two ears 49, 49 bent at right angles to a base plate 50, said plate being secured to the underside of the turntable by screws 51. The shorter arm 45 of the bell crank has a bevelled face 52 adapted to cooperate with the bevelled face 43 on the lower end of shaft 26. The longer arm or brake shoe or brake finger projects upwardly and, when the bevelled faces are related as shown in Fig. 4, lies within a recess 53a in the wall of the post to permit records to drop unrestrained onto the turntable or onto records piled thereon. When, however, the shaft 26 is rotated through 180° from the position shown in Fig. 4, the brake shoe or finger 46 is free to move outwardly of the recess. To move the shoe outwardly and to cause the same to resiliently restrain a record from rotating at a different speed from that of the turntable, a spring 53 is coiled around the sleeve of the bell crank lever with one end 54 bearing against the base plate and the other end 55 hooked under and reacting against the short arm of the lever. The bevel 43 on the shaft 26 is so located that when the eccentric pin 34 has withdrawn the ledge member 36, the lowermost point of the bevel 43 is engaging the arm 45 to withdraw the brake shoe 46 into the recess, all as shown in Fig. 4. When the ledge member 36 is projected, however, the bevelled shaft 26 is in the position shown in Fig. 1 and the coil spring is then free to urge the shoe 46 outwardly into frictional engagement with the edge of the hole in the record disc. The disc engaging face of the brake shoe is preferably lined with antifriction material indicated at 46'. Due to the slight inclination of the disc engaging surface of the brake shoe when it is in the operative position of Fig. 1, the shoe is most effective on the topmost record disc in playing position.

A plate 56 rotatable with respect to the support member 10 underlies the post portion of the turntable and is held in place by means of a screw 57 engaging a threaded recess in the lower end 25 of the pin 24.

Having thus described my invention, what I claim is:

1. In an automatic disc type record changer, a turntable, a post extending therefrom, means adjacent the upper end of the post to retain a stack of records and release them one by one for sliding movement down along the post to record playing position, said record retaining and releasing mechanism including a retractable shelf and projectable knife thereabove operation in alternation to release one record at a time from beneath the stack while yet retaining the records above the lowermost one, driven means within the post to operate said shelf and knife, a shaft extending downwardly through the post drivingly connected at its upper end with said driven means, friction applying means mounted at the lower end of the post having a friction finger extending upwardly substantially along the peripheral portion of the post, biasing means urging the finger so that at least a portion thereof projects beyond the periphery of the post and into frictional engagement with the record to be played, means cooperative with the friction means and the lower end of the shaft to withdraw the friction finger to a position within the periphery of the post upon rotation of the shaft and release of a record, and then release the finger to the action of the biasing means to engage the released record upon the record assuming playing position, said means including a cam on the lower end of said shaft and a cam on the friction means and mounted to be directly engaged by said first cam.

2. The structure of claim 1 wherein the friction means is in the form of a bell crank pivoted on the post with one arm of the bell crank forming the friction applying means and the other arm being bevelled to provide the cam on the friction means.

3. The structure of claim 1 wherein the shaft is rotatable in the post and carries at its upper end an eccentric pin cooperative with said shelf and knife, to effect movement of the shelf and knife in alternation, with the finger and shelf withdrawn while the knife is projected and with the finger and shelf projected while the knife is retracted.

References Cited in the file of this patent

UNITED STATES PATENTS

| | | |
|---|---|---|
| 1,438,000 | Underhill | Dec. 5, 1922 |
| 1,931,487 | Collison et al. | Oct. 24, 1933 |
| 2,293,212 | Offen | Aug. 18, 1942 |
| 2,634,135 | Carson | Apr. 7, 1953 |
| 2,643,129 | Habegger | June 23, 1953 |